(12) United States Patent
Dow

(10) Patent No.: X3262
(45) Date of Patent: Nov. 24, 1820

(54) MEDICINE

(76) Inventor: Lorenzo Dow

Lorenzo Dow
Letters Patent

The schedule referred to in these Letters Patent and making part of the same containing a description in the words of the said Lorenzo Dow him self of his improvement in Medicine

---

1. Take nine pounds of genuine Epsom salts, dissolved in soft boiling water the whole making eight quarts to which add the tincture of Blood root, san-guinaria, say four ounces. 2. Take one pound pure Salts Nitre dissolved in boiling water adding eight ounces sulphuric acid of the best quality, the whole making four quarts all of which must be stirred with a wood-en stick and when cool mixing the same with the above Epsom Salts and Blood root solution, which will constitute Dow's family Medicine in its full strength in its concentrated state. The whole process must be performed in stone or earthen vessels, and afterwards preserved in glass. One or two table spoons full in a half pint of cold water or less quantity of each may be taken once in two hours until it operates freely. This medicine has been found of general utility and efficacy in all those disorders called billious and affections of the liver exceeding common credibility even in many cases wherein repeated courses of mercurials have been used in vain, Costive habits a corrective and in Dysen-tery a speedy relief is obtained Witnesses
James Friend
Oliver Friend Lorenzo Dow Ex'd
CHW.